March 7, 1950 R. A. GULL 2,499,858
SIGNAL-SEEKING RECEIVER
Filed June 7, 1946
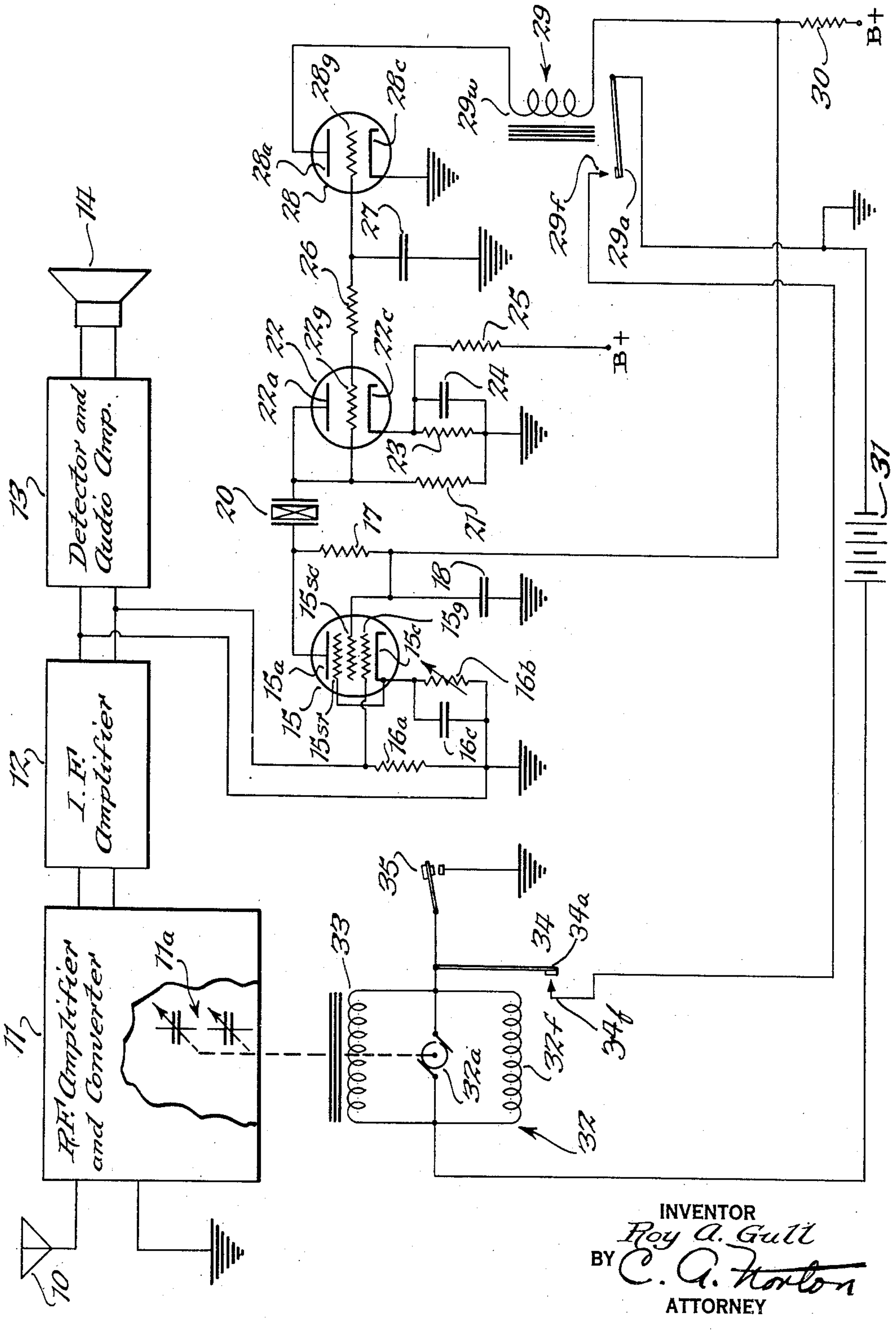
INVENTOR
Roy A. Gull
BY C. A. Norton
ATTORNEY Patented Mar. 7, 1950

2,499,858

UNITED STATES PATENT OFFICE 2,499,858

SIGNAL-SEEKING RECEIVER

Roy A. Gull, Kenmore, N. Y., assignor to Colonial Radio Corporation, Buffalo, N. Y.

Application June 7, 1946, Serial No. 674,964

9 Claims. (Cl. 250—40)

This invention relates to improvements in signal-seeking receivers, and more particularly to circuits employed therein which substantially reduce the constructional cost thereof without seriously impairing the operation and provide for more sensitive control than has heretofore been possible. This application is a continuation in part of my application, Serial No. 674,963 filed June 7, 1946.

For the purposes of this specification, a signal-seeking receiver is defined as a receiver in which the tuning instrumentality is power driven, for instance, by an electric motor, and when set into operation, scans its tuning spectrum until an incoming signal of predetermined strength is tuned in.

At this point the incoming signal voltage operates a relay, through the medium of a control tube, which de-energizes the tuning motor and in addition may de-clutch the tuning motor from the tuning instrumentality and apply a brake to the tuning instrumentality so that the receiver remains tuned to the desired signal.

This action is purely automatic and requires no care or attention and no skill on the part of the operator. Also, if the apparatus is properly designed and constructed, it will tune the incoming signal more accurately than can possibly be done manually.

If the operator wishes to change to another station, all that is necessary is momentarily to operate a push button, which starts the tuner motor in operation, releases the brake, clutches the motor to the tuning instrumentality (if clutch and brake are employed), and the tuner will scan until another incoming signal of predetermined strength is received, whereupon the receiver de-energizes the motor and remains tuned to the particular signal, until the operator again sets it in operation to look for another station.

In apparatus of the type heretofore proposed, it has been suggested to utilize a portion of the output of the intermediate frequency amplifier, which portion is then passed through a limiter, and the output of the limiter is then passed through a balanced tuned bridge circuit embodying a piezoelectric crystal tuned to the center frequency of the intermediate frequency band. The voltage from this tuned bridge circuit is then used to control a vacuum tube having a relay in its plate circuit, and this relay controls the tuner motor and the clutch and brake mechanism, if employed.

In accordance with my invention, I achieve a considerable saving in cost by eliminating the transformer and other parts of the conventional tuned bridge circuit, and I employ instead, a resistor in the plate circuit of the limiter tube. The output of this limiter tube is then coupled to the control tube grid directly through the crystal or through the crystal in series with a resistor and a blocking condenser, in case it is desired to keep direct current voltage off the crystal.

In addition, I provide means whereby, when the control tube current begins to drop in response to an incoming signal, this effect is utilized and fed back to the limiter tube in such a manner as to strengthen the action. That is to say, when the control tube current begins to drop because of the action of a signal being tuned in, the effect is fed back to the limiter tube in such a manner as to produce an increased output of the limiter tube, this in turn producing a still further drop of current in the control tube and so on, the result being in a sense analogous to regeneration in that the circuit becomes more sensitive and will respond, by stopping the tuner motor, to signals which would be insufficient to stop it in the absence of my invention.

From the foregoing, it will be understood that it is an object of this invention to provide a simplified and more economical control circuit for stopping the receiver in response to incoming signals, and a circuit which will stop the receiver in response to incoming signals which would otherwise be insufficient to produce a reliable action.

It is a further object of this invention to eliminate the transformer and other component parts of the crystal bridge circuit heretofore employed and to substitute for them a greatly simplified circuit at a considerable saving in cost and to provide a circuit in which the stopping action is more sensitive than in the circuits heretofore proposed.

It is a further object of this invention to reduce the cost of a signal-seeking receiver and at the same time to substantially increase the sensitivity of the stopping action.

Still other objects and advantages of my invention will be apparent from the specification.

The features of novelty which I believe to be characteristic of my invention are set forth with particularity in the appended claims. My invention itself, however, both as to its fundamental principles and as to its particular embodiments, will best be understood by reference to the specification and accompanying drawing, in which The single figure is a circuit diagram of an improved signal-seeking receiver in accordance with my invention.

Referring now more particularly to the drawing, 10 represents an antenna of any suitable type, feeding radio frequency amplifier and converter 11, tuned by any suitable tuning instrumentality, herein indicated as gang condenser 11*a*. The output of the converter is then supplied to intermediate frequency amplifier 12 and thence to detector and audio amplifier 13 and loud speaker 14.

In accordance with the embodiment of the invention herein shown and described, and which will be understood to be merely by way of example, since other arrangements may be employed, a portion of the output of intermediate frequency amplifier 12 is impressed upon limiter 15. This may, and usually will, be a limiting amplifier tube having cathode 15*c*, control electrode 15*g*, screen 15*sc*, suppressor 15*sr*, and anode 15*a*.

Cathode 15*c* will usually be connected to ground through self-biasing resistor 16*b* shunted by bypass condenser 16*c*, and control electrode 15*g* is connected to ground through resistor 16*a*. Resistor 16*b* may be variable if desired, for the purpose of controlling the level of the incoming signal at which the receiver will stop scanning.

Anode 15*a* may be connected through resistances 17 and 30 in series to the B+ terminal. Screen 15*sc* is connected to the common point of resistances 17 and 30 and may be by-passed to ground through condenser 18. Suppressor 15*sr* is connected to cathode 15*c* as usual.

Anode 15*a* is connected to one terminal of piezoelectric crystal 20, the other terminal of which may be connected to control electrode 22*a* of tube 22, having cathode 22*c*, control electrode 22*g*, and anode 22*a*. Tube 22 is preferably connected to operate as a rectifier, anode 22*a* and control electrode 22*g* being connected together and to ground through resistance 21.

Cathode 22*c* is connected to ground through resistor 23 shunted by by-pass condenser 24, and is connected to B+ through resistor 25. Control electrode 22*g* is also connected to the control electrode 28*g* of control tube 28 through resistor 26, the grid 28*g* is connected to ground through condenser 27.

Tube 28, the control tube, may comprise cathode 28*c*, control electrode 28*g*, and anode 28*a*. Cathode 28*c* may be connected directly to ground, and anode 28*a* is connected through energizing winding 29*w* of relay 29 to the common point of resistances 17 and 30, thence through resistance 30 to B+. The negative side of the B source will be grounded, as usual.

Relay 29 controls the motor circuit, and the motor may consist of armature 32*a*, field winding 32*f*, and clutch and brake winding 33, which operates any suitable clutch and brake mechanism interposed between the motor shaft and the shaft of the tuning instrumentality 11*a*.

In addition to control relay 29, lock-in relay 34 is provided, which is closed to front contact 34*f* when tuner motor 32 is energized. The tuner motor may derive its power from source 31, and manual switch 35 may be provided, connected between armature 34*a* of relay 34 and ground.

By tracing the contacts of the motor control circuit, it will be noted that when switch 35 is closed manually, a circuit is provided, energizing the tuner motor and the clutch and brake mechanism independently of relays 29 and 34, so that as long as switch 35 is held in closed position against its spring bias (switch 35 is usually a push button), the motor will operate and the receiver will scan.

If no incoming signal is being received, there will be no bias on control tube 28, normal plate current will be drawn, and relay 29 will be closed against front contact 29*f*, thus preparing the motor circuit for energization through relay 34.

If, at this time, push button switch 35 is closed, motor field winding 32*f* will be energized and relay 34 will be closed to front contact 34*f* and locked in, and the motor circuit will remain energized even though switch 35 then be permitted to open.

Operation of the apparatus will now be described. Assuming that the tubes are lighted and have warmed up, and also that the receiver is tuned to an incoming signal of predetermined strength, piezoelectric crystal 20 is tuned to the center frequency of the intermediate frequency band, and intermediate frequency currents will be delivered to rectifier tube 22 and will be impressed upon the grid 28*g* of control tube 28, biasing it negatively to or nearly to cutoff, and relay 29 will be open. The receiver will, therefore, remain tuned to the incoming signal.

If the operator wishes to select another station, he will momentarily close switch 35. This, as already explained, energizes the motor and the clutch and brake mechanism, and causes tuning instrumentality 11*a* to scan. As soon as the incoming signal is de-tuned, no output of the intermediate frequency amplifier is impressed on tube 15, no currents are rectified by tube 22, the bias on tube 28 due to incoming signals disappears, and that tube begins to draw normal plate current which is sufficient to close relay 29.

Since relay 34 has already been closed by the closure of switch 35, the motor circuit is now locked in and switch 35 may be released, permitting it to open, without stopping the motor. The receiver will continue to scan until the next signal of predetermined strength is tuned in, at which time tube 15 again impresses intermediate frequency currents through crystal 20 on rectifier 22, which in turn biases tube 28 to a point where relay 29 opens.

As this action begins to occur, that is to say, as grid 28*g* begins to move in a negative direction, the plate current of tube 28 begins to decrease, and the I. R. drop through resistance 30 likewise decreases.

As a result of this, the potential of screen 15*sc* and of anode 15*a* of tube 15 begins to increase, and this tube delivers a greater output. This in turn produces a greater negative bias on grid 28*g* of tube 28, still further decreasing the plate current, and this in turn still further decreases the I. R. drop through resistance 30 and increases the voltage on screen 15*sc* and anode 15*a*.

This action, as will be seen, is analogous to regeneration in that the desired effect is caused to repeat itself, building up in strength as it does so. The result is a reduction in time of decrease of current through relay winding 29*w* and also a reliable opening of this relay with incoming signals of a strength which would otherwise be insufficient for the purpose.

In case there is no objection to applying the direct current voltage to crystal 20, the connection may be made as shown. If, however, this is objectionable, a blocking condenser may be inserted between anode 15*a* and crystal 20. It will be noted that this arrangement dispenses with inductance and the inductance capacity resonance effect heretofore employed in the tuned bridge circuit coupling tube 15 and control tube 28.

The circuit according to my invention is frequency selective, the piezoelectric crystal employed being so chosen as to resonate piezoelectrically to the center of the intermediate frequency band, but no adjustment of inductance and/or capacity as was formerly necessary is required. Indeed, it will be noted that no inductance is provided in the circuit.

In the specification I have explained the principles of my invention and the best mode in which I have contemplated applying those principles, so as to distinguish my invention from other inventions; and I have particularly pointed out and distinctly claimed the part, improvement, or combination which I claim as my invention or discovery.

While I have shown and described certain preferred embodiments of my invention, it will be understood that modifications and changes may be made without departing from the spirit and scope thereof, as will be clear to those skilled in the art.

I claim:

1. In a signal-seeking receiver having a variable tuning instrumentality, power-operated means for varying said tuning instrumentality; a manual control for causing said power means to vary said tuning instrumentality; and means responsive to tuning in of a signal of predetermined strength for stopping variation of said tuning instrumentality, said last-mentioned means including a control-signal repeater tube having at least a cathode, an anode, and a control electrode; a control tube having cathode, anode, and control electrodes; frequency-selective means serially coupled between the anode of said repeater tube and the control electrode of said control tube for translating said control signal; a relay connected in the space-current path of said control tube for interrupting the supply to said power-operated means; a source of anode potential connected between the anode and cathode of each of said tubes continuously to supply operating potential to said each tube independently of the other tube; and a voltage-dropping impedance included in common in the space-current path of both of said tubes to vary the anode potential of said repeater tube inversely with the space current of said control tube.

2. In a signal-seeking receiver having a variable tuning instrumentality, power-operated means for varying said tuning instrumentality; a manual control for causing said power means to vary said tuning instrumentality; and means responsive to tuning in of a signal of predetermined strength for stopping variation of said tuning instrumentality, said last-mentioned means including a control-signal repeater tube having at least a cathode, an anode, and a control electrode; a rectifier device; frequency-selective means serially coupled between the anode of said repeater tube and said rectifier device for translating said control signal to said rectifier device to derive from said signal a unidirectional control potential; a control tube having an anode and cathode and having a control electrode coupled to said rectifier device to have applied thereto said unidirectional control potential; a relay connected in the space-current path of said control tube for interrupting the supply to said power-operated means; a source of potential connected between the anode and cathode of each of said tubes continuously to supply operating potential to said each tube independently of the other tube; and a voltage-dropping impedance included in common in the space-current paths of both of said tubes to vary the anode potential of said repeater tube inversely with the space current of said control tube.

3. The combination claimed in claim 2, in which a delay bias is applied to said rectifier device, said delay bias being obtained from said common plate supply but independent of said voltage dropping impedance.

4. The combination claimed in claim 1, in which said frequency selective means is free of inductance.

5. The combination claimed in claim 2, in which said frequency selective means is free of inductance.

6. The combination claimed in claim 1, in which said frequency selective means comprises a piezoelectric crystal and is free of inductance.

7. The combination claimed in claim 2, in which said frequency selective means comprises a piezoelectric crystal and is free of inductance.

8. In a signal-seeking receiver having a variable tuning instrumentality, power-operated means for varying said tuning instrumentality; and means responsive to tuning in of a signal of predetermined strength for stopping variation of said tuning instrumentality, said last-mentioned means including a control-signal repeater tube having at least a cathode, an anode, and a control electrode; a control tube having cathode, anode, and control electrodes; frequency-selective means serially coupled between the anode of said repeater tube and the control electrode of said control tube for translating said control signal; a relay connected in the space-current path of said control tube for interrupting the supply to said power-operated means; a source of potential for supplying operating potential to the anode of each of said tubes independently of the other tube and for supplying an operating potential to a control electrode of one of said tubes; and a voltage-dropping impedance included in common in the space-current paths of both of said tubes to vary the anode potential of said repeater tube inversely with the space current of said control tube.

9. In a signal-seeking receiver having a variable tuning instrumentality, power-operated means for varying said tuning instrumentality; and means responsive to tuning in of a signal of predetermined strength for stopping variation of said tuning instrumentality, said last-mentioned means including a control-signal repeater tube having at least a cathode, an anode, and a control electrode; a control tube having cathode, anode, and control electrodes; frequency-selective means serially coupled between the anode of said repeater tube and the control electrode of said control tube for translating said control signal; a relay connected in the space-current path of said control tube for interrupting the supply to said power-operated means; a source for supplying operating potential to the anodes of each of said tubes independently of the other tube and for supplying an operating potential to a control electrode of said repeater tube; and a voltage-dropping impedance included in common in the space-current paths of both of said tubes to vary the anode and control-electrode potentials of said repeater tube inversely with the space current of said control tube.

ROY A. GULL.

REFERENCES CITED

The following references are of record in the file of this patent:

UNITED STATES PATENTS

| Number | Name | Date |
| --- | --- | --- |
| 2,044,645 | Stapleton et al. | June 16, 1936 |
| 2,231,806 | Goldsborough | Feb. 11, 1941 |
| 2,304,871 | Andrews | Dec. 15, 1942 |

OTHER REFERENCES

Wireless World, Oct. 18, 1935, pages 420-422, Aerodyne Aeromagic Receiver. Print in 250-40.11.